United States Patent [19]
Cole

[11] 3,789,498
[45] Feb. 5, 1974

[54] METHOD OF DIFFUSION BONDING

[75] Inventor: Frederic W. Cole, Detroit, Mich.

[73] Assignee: AMBAC Industries, Incorporated, Carls Place, N.Y.

[22] Filed: Nov. 1, 1971

[21] Appl. No.: 194,231

[52] U.S. Cl. ..................... 29/470.9, 29/498, 245/2, 245/10
[51] Int. Cl. ..................... B23k 1/20
[58] Field of Search ..................... 245/1–11; 29/470.9, 471.1, 472.1, 498

[56] References Cited

UNITED STATES PATENTS

| | | | |
|---|---|---|---|
| 2,109,010 | 2/1938 | Ingersoll | 29/470.9 |
| 2,438,759 | 3/1948 | Lieboultz | 29/470.9 X |
| 2,711,966 | 6/1955 | Watson | 29/470.9 UX |
| 3,206,847 | 9/1965 | Keeleric | 29/498 X |
| 3,435,504 | 4/1969 | Miller | 29/470.9 X |
| 3,533,153 | 10/1970 | Melill et al. | 29/471.1 X |
| 3,489,534 | 1/1970 | Levistein | 29/471.1 X |
| 3,638,298 | 2/1972 | Singer et al. | 29/498 X |
| 3,658,565 | 4/1972 | McGlynn | 29/470.9 X |

FOREIGN PATENTS OR APPLICATIONS

| | | | |
|---|---|---|---|
| 196,534 | 1967 | U.S.S.R. | 29/471.1 |

OTHER PUBLICATIONS

Kehr, W. D., "Manufacturing Laminated Structures," IBM Technical Disclosure Bulletin, Vol. 12, No. 4, Sept., 1969. 29–498.

*Primary Examiner*—J. Spencer Overholser
*Assistant Examiner*—Ronald J. Shore
*Attorney, Agent, or Firm*—Harness, Dickey & Pierce

[57] ABSTRACT

A separator is used in the diffusion bonding of materials such as wire cloth and laminates to prevent unwanted bonding of adjacent surfaces. The separator sheet is formed by the oxidation of metal alloy surfaces either before or during the bonding to form a refractory oxide barrier layer. Iron-chromium-aluminum alloys are especially useful and may be modified by the addition of rare earth metals such as yttrium.

11 Claims, 1 Drawing Figure

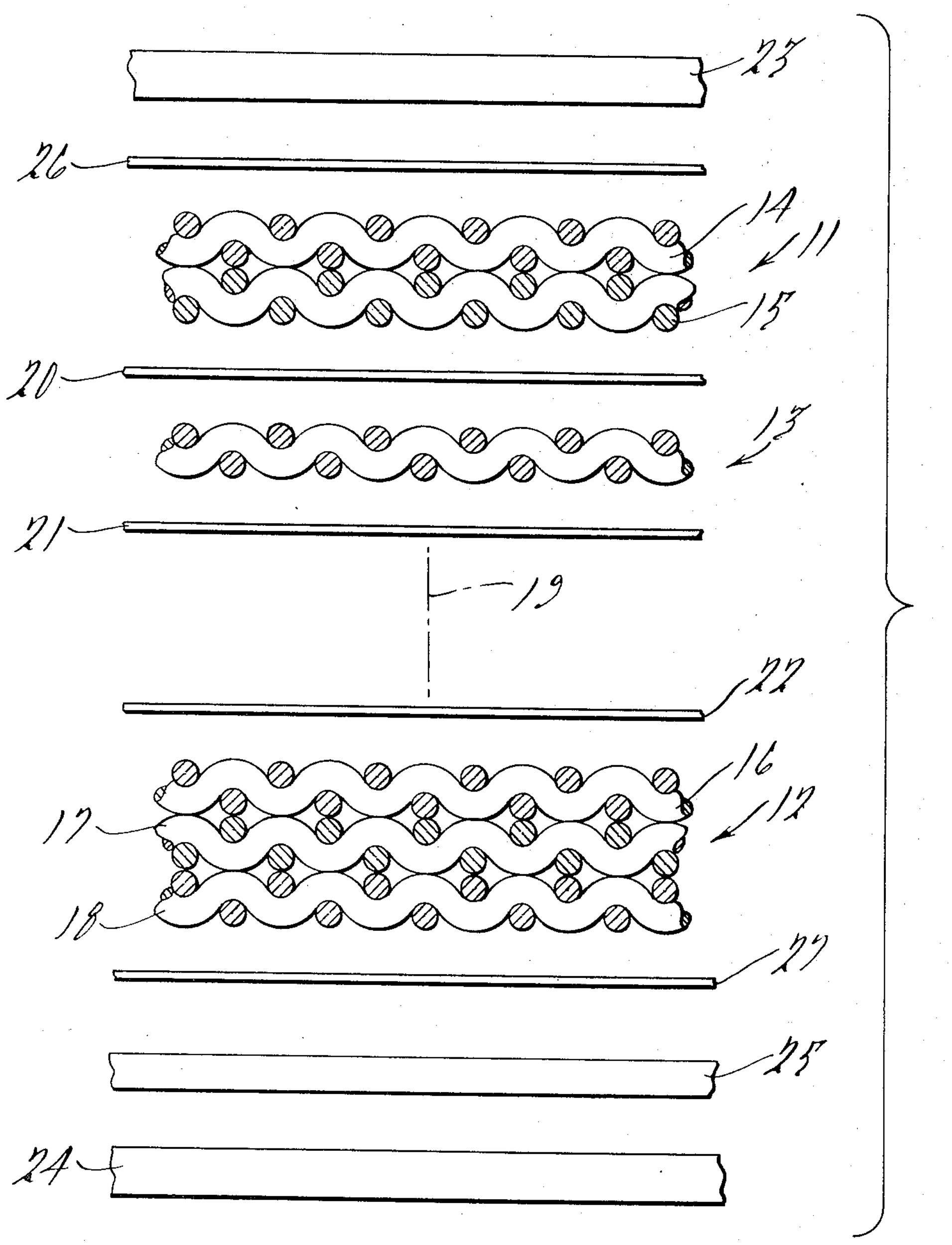
INVENTOR.
Frederic W. Cote
BY
Harness, Dickey & Pierce
ATTORNEYS.

METHOD OF DIFFUSION BONDING

BACKGROUND OF THE INVENTION

1. Field of the Invention

Wire mesh materials may be laminated by diffusion bonding. Multiple layers of selected wire meshes are oriented and stacked to form a composite material. The individual layers are bonded together and to adjacent layers by a diffusion bonding process such as sintering or brazing. The resultant material has useful engineering properties for a wide variety of technical applications.

Diffusion bonding is accomplished by heating the laminate (or even single sheets) to a sufficiently high temperature in an inert or reducing atmosphere. Sintering is a type of diffusion bonding which consists of joining by simple atomic diffusion or vapor condensation at points of contact. Brazing is a similar process except that additional metals are added to the joint to modify bonding characteristics. An inert atmosphere (including vacuum) or a reducing atmosphere is needed to provide a clean, non-oxidized bonding surface for joining.

It is economical to diffusion bond many laminate sheets at one time. The sheets may be stacked vertically, but they must be separated by an inert barrier material to prevent unwanted bonding of adjacent laminates. A separator must also be used to prevent bonding to contacting furnace or retort fixtures such as grates, plates and weights.

The separator material should be non-reactive to prevent bonding of the laminate to the separator and to avoid interference with the laminate bonding. The separator should not contaminate the laminate metal or the atmosphere. It should be economical to use and provide good heat transfer characteristics within the stack. Presently used materials are deficient in one or more of these categories.

2. Description of the Prior Art

Ceramic solid plates or forms, made from refractory oxides such as alumina, silica, magnesia, titania or zirconia and various oxide mixtures, are suitable for separation, but are thick and heavy with poor mechanical and heat transfer properties.

Alumina-silica fiber papers or felts are expensive because they cannot be reused after exposure to high temperature. They are degraded to a powder which must be cleaned from the laminate, and the silica content may be partially reduced at high temperature, resulting in metallurgical degradation. The high surface area of the fibers result in significant water vapor adsorption and high off-gassing in vacuum applications. Heat transfer within the felt is poor.

Coated metal separator sheets answer many of these objections but also introduce new problems. Stop-off compounds, consisting of alumina, titania, magnesia, or calcium carbonate powders dispersed with a lacquer binder, may be painted or sprayed on a metal sheet. The refractory oxides provide separation. The metal sheet is thin, reusable and has good heat transfer properties. However, during heat treatment the lacquer binder burns off and may contaminate the atmosphere or the laminate metal. The refractory oxides are converted to loose powders which must be cleaned from the laminate. Chemically inert oxides such as alumina or titania must be mechanically removed. Magnesia or calcia can be chemically dissolved in dilute acid-water solutions. The metal sheet must be re-coated to be used again.

Plasma sprayed refractory oxide coated metal sheets are an improvement. The oxide is permanently bonded to the sheet and does not contaminate the atmosphere or the laminate. Cleaning problems are eliminated. However, plasma arc spraying is relatively expensive. Mechanical damage to the oxide coating must be detected and repaired. Small scratches or spraying "misses" may leave bare areas which bond to the laminate.

BRIEF SUMMARY OF THE INVENTION

The invention relates to the use of a novel separator sheet material for diffusion bonding processes in which the refractory oxide barrier layer is formed by oxidation of a metal alloy surface. Iron-chromium-aluminum alloys which form alumina coatings on oxidation are especially useful. Modification of the basic aluminum oxide film by the addition of rare earth metals such as yttrium further improves the separator barrier. A suitable alloy sheet metal is 80Fe-15Cr-4Al-1Y.

BRIEF DESCRIPTION OF THE DRAWING

In the drawing, the FIGURE is a diagrammatic view of a plurality of laminate sheets stacked so as to be diffusion bonded at one time and incorporating the separator sheets of this invention to prevent unwanted bonding.

DESCRIPTION OF THE PREFERRED EMBODIMENT

Referring to the FIGURE, a typical application of the present invention would be in the diffusion bonding of a plurality of stacked laminates two of which are generally indicated at 11 and 12, with 13 indicating a single layer of wire mesh in which the crossed wires are to be diffusion bonded. In this case, laminate 11 has two wire mesh layers 14 and 15, laminate 12 having three layers 16, 17 and 18. Additional laminates or single layers are indicated by the dashed line 19 between laminate 12 and wire mesh 13.

The separator sheets which are the subject of the present invention are placed between adjacent laminates or single mesh layers as the case may be. One such sheet 20 is shown between laminate 11 and layer 13, another sheet 21 is on the other side of layer 13 and a sheet 22 is disposed between laminate 12 and the laminate or layer (not shown) immediately above it. The stack of laminates and cloths to be bonded are disposed within upper and lower plates 23 and 24 respectively. These plates may be fabricated of stainless steel, and in some cases a so-called "slip sheet" may be placed inside one of the plates as indicated at 25. Separator sheets 26 and 27 are used to prevent bonding of the laminates to the plates or slip sheets. The entire assembly is heated in an inert or reducing atmosphere to a sufficiently high temperature to accomplish the sintering or brazing.

The new separator sheet development was based on the observation that metal alloys containing small quantities of aluminum and/or titanium are difficult to sinter bond. Aluminum and titanium oxides are preferably formed on the metal surface and act as a barrier to inhibit atomic diffusion between base alloy metal surfaces. The oxides are thermodynamically very stable and, once formed, cannot be reduced or dissociated under practical conditions of temperature and atmosphere. These properties are desirable in a separator sheet material.

A wide variety of alloy types containing aluminum and titanium were tested. One alloy class was clearly superior: iron-chromium-aluminum alloys. The oxide film apparently consisted largely of pure aluminum oxide. It was thin, adherent and uniform with good diffusion barrier properties.

The iron-chromium-aluminum alloy compositions tested extended over a fairly wide range: 12-25Cr, 2-6Al. A O-Cr, 16Al alloy system showed some promise. The best compromise of mechanical, physical and chemical properties was chosen to be a 15Cr-4Al alloy. This alloy was strong, ductile, not susceptible to heat-aging embrittlement and produced a good oxide film. A 25Cr-6Al alloy was also very good.

A modification of the basic 15Cr-4Al alloy was also tested. This alloy contained about 0.5–1.0 percent yttrium. The alloy oxide film was further improved. The aluminum oxide was apparently modified by combination with the yttrium oxide, either through mixed lattice growth or a fluxing reaction. The oxide film was very thin, very adherent and glassy, and extremely uniform. A similar effect may be obtained using other rare earth modifiers by direct alloying or by treatment of the basic aluminum oxide film.

The simplest and most economical method of applying this invention is to produce a separator sheet or other form from 15Cr-4Al-1Y alloy. The separator may be preoxidized by heating in an oxidizing atmosphere for a few hours at 1,600° F. or higher temperature. This treatment produces a stable barrier oxide film. The film may also be produced by simply using the separator sheet. Most diffusion bonding process atmospheres contain sufficient oxygen or water vapor to cause adequate separator oxidation.

The improved separator sheet overcomes all of the deficiencies of presently used separator materials. It may be produced in very thin, strong, ductile sheets having low mass and heat capacity with good heat conductivity and diffusivity. Minimum surface area is available for gas and water vapor adsorption, resulting in very low off-gassing or atmosphere contamination. The oxide film is uniform, stable and inert to diffusion by metal alloys and brazing compounds. This layer is very thin and adherent, eliminating the need for cleaning laminates after processing. Mechanical damage to the film is automatically "repaired" by simple reoxidation of the abraded surface during normal use.

I claim:

1. A method of diffusion bonding multiple stacked metal laminates or cloths each laminate or cloth containing a plurality of metal parts to be diffusion bonded, comprising the steps of placing thin reusable metallic separator sheets between adjacent laminates or cloths, each separator sheet being formed from the class of metal alloys which form a thermodynamically stable refractory metal oxide on the exposed surfaces thereof under conditions of temperature and atmosphere at which said laminates or cloths will diffusion bond and heating the laminates or cloths and separator sheets in an inert or reducing atmosphere to bond engaging portions of the metal parts of each of said laminates or cloths without bonding the laminates or cloths to said separator sheets and whereby said separator sheets will reform said refractory oxide during the bonding of said laminates or cloths on surface areas thereof from which oxide has been inadvertently removed during handling.

2. The method according to claim 1, each sheet consisting of an iron-chromium-aluminum alloy.

3. The method according to claim 2, each sheet having a composition of about 80 percent iron, 15 percent chromium and 4 percent aluminum.

4. The method according to claim 3, each sheet having about 0.5 – 1.0 percent of a rare earth metal.

5. The method according to claim 4, said rare earth metal being yttrium.

6. The method according to claim 2, each sheet having a composition of 69 percent iron, 25 percent chromium and 6 percent aluminum.

7. A method of diffusion bonding a multiple stacked layer of metals laminates or cloths comprising the steps of taking separator sheets having an iron-chromium-aluminum alloy composition, preoxidizing the separator sheets by heating in an oxidizing atmosphere to form a stable barrier oxide film, inserting the sheets between the laminates or cloths each laminate or cloth containing a plurality of metal parts to be diffusion bonded, pressing the stack together and heating the stack in an inert or reducing atmosphere to diffusion bond the metal parts of each laminate or cloth the separator sheets preventing unwanted bonding of the surfaces of the metal parts adjacent thereto.

8. The combination according to claim 7, said separator sheets also being placed between the outermost laminates or cloths and the adjacent means for pressing the stack together.

9. The combination according to claim 7, the composition of said separator sheets being in the range of 12 – 25 percent chromium and 2 – 6 percent aluminum.

10. The combination according to claim 7, the composition of said sheets including 15 percent chromium and 4 percent aluminum.

11. The combination according to claim 10, the alloy also containing about 0.5 – 1.0 percent of a rare earth metal such as yttrium.

* * * * *